Feb. 24, 1931.  A. R. GRIGSBY ET AL  1,794,170
VEHICLE
Filed Oct. 25, 1929   2 Sheets-Sheet 2
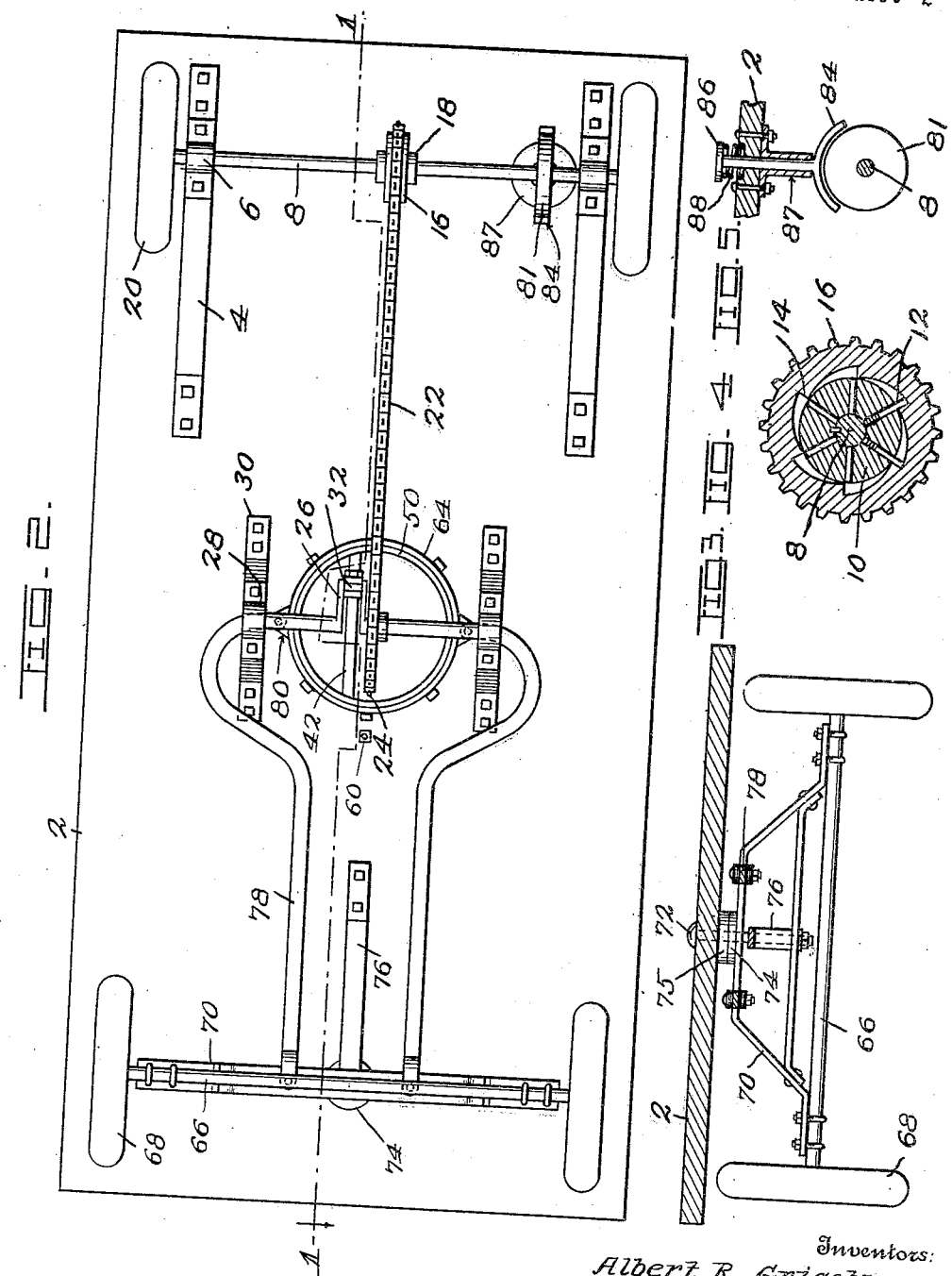
Witness:
Fred C. Fischer.
Inventors:
Albert R. Grigsby
and Harold Brown,
By
F. G. Fischer,
Attorney.

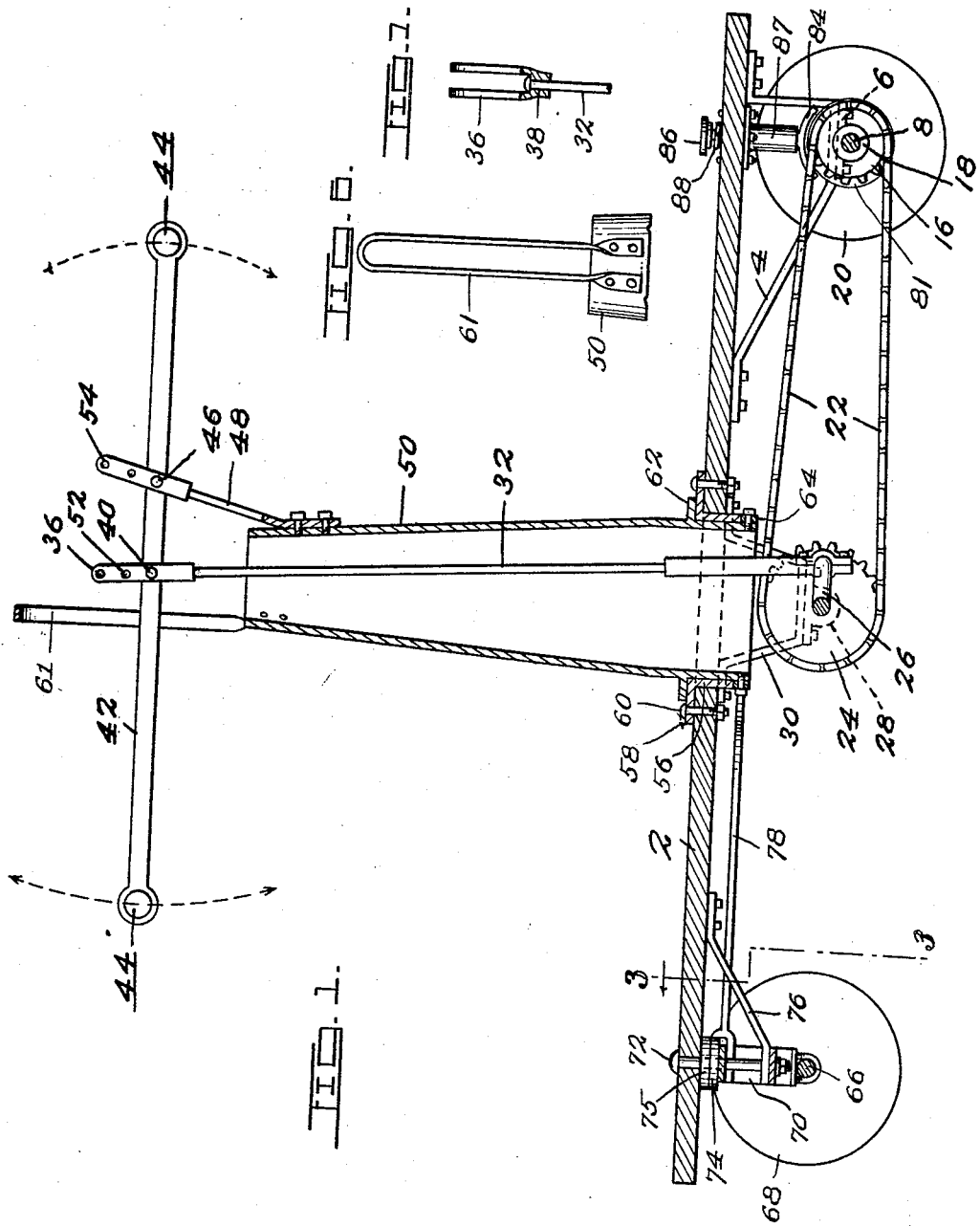

Patented Feb. 24, 1931

1,794,170

UNITED STATES PATENT OFFICE

ALBERT R. GRIGSBY, OF KANSAS CITY, MISSOURI, AND HAROLD BROWN, OF KANSAS CITY, KANSAS, ASSIGNORS TO UNIVERSAL TOY CORPORATION, OF KANSAS CITY, KANSAS

VEHICLE

Application filed October 25, 1929. Serial No. 402,447.

Our invention relates to vehicles intended more particularly for use by childern and one object is to provide a vehicle of this character with manually controlled propelling mechanism which will provide healthful exercise as well as pleasure for the children who use the vehicle.

A further object is to so arrange the propelling mechanism that the vehicle may coast and thus enable the operator to rest when going down grade.

Another object is to provide the vehicle with steering mechanism which is controlled by the propelling mechanism so that collision with obstructions may be avoided. We also provide the vehicle with brake mechanism, which, together with the propelling and steering mechanisms, enables a child to effectively control said vehicle.

Another object is to provide a vehicle of substantial construction which will withstand the hard usage to which vehicles of this character are subjected.

In order that the invention may be fully understood, reference will now be had to the accompanying drawing, in which:

Fig. 1 is an irregular sectional view of the vehicle on line 1—1 of Fig. 2.

Fig. 2 is an inverted plan view of the vehicle.

Fig. 3 is a section on line 3—3 of Fig. 1.

Fig. 4 is a section of a ratchet mechanism employed in carrying out the invention.

Fig. 5 is a detail of a brake mechanism for controlling the speed of and stopping the vehicle.

Fig. 6 is a detail of a loop and its support.

Fig. 7 is a broken sectional view of the upper portion of a pitman forming part of the propelling mechanism.

In carrying out the invention, we employ a body 2 consisting preferably of a platform equipped at its rear portion with a pair of brackets 4 provided with bearings 6 in which a rear axle 8 is journaled. The rear axle 8 is provided with a fixedly mounted disk 10 equipped with a plurality of radially arranged pawls 12 for engagement with the internal ratchet teeth 14 formed within a sprocket wheel 16 having a hub 18 loosely mounted upon the axle 8. A pair of conveyer wheels 20 are mounted upon the rear axle 8 and one of said wheels is fixed to and driven by said axle.

The sprocket wheel 16 is connected by an endless sprocket chain 22 to a sprocket wheel 24 fixedly mounted upon a crank shaft 26 journaled in bearings 28 secured to a pair of brackets 30 depending from the underside of the body 2.

32 designates a pitman operably connected at its lower end to the crank shaft 26. The pitman 32 is provided at its upper end with a bifurcated member 36 which is swiveled upon the pitman as indicated at 38, so that it may turn axially independently of said pitman for a purpose hereinafter described.

The bifurcated member 36 is provided with a pivot 40 which extends through a lever 42 equipped at each end with a handle 44. The lever 42 is fulcrumed upon a pivot 46 carried by a bracket 48 projecting from a member 50. The bifurcated member 36 and the bracket 48 are provided with a plurality of holes 52 and 54, so that the pivots 40 and 46, respectively, may be raised or lowered to adjust the lever 42 up or down for children of different heights.

The member 50 is preferably in the form of a tubular column surrounding the major portion of the pitman 32 to protect the children from injury by said pitman when the latter is in operation. The member 50 is rotatably mounted at its lower end in an annular bearing 56 extending through an opening in the body 2 and provided with a marginal flange 58 secured to said body by suitable means such as bolts 60. The member 50 is held from vertical movement in the bearing 56 by a peripheral flange 62 and a collar 64. The flange 62 rests upon the flange 58, while the collar 64 is secured to the lower end of the member 50 and abuts the under side of the bearing 56 as shown by Fig. 1.

66 designates a front axle arranged beneath the forward portion of the body 2 and equipped with a pair of conveyer wheels 68. The axle 66 is firmly secured to a bolster 70 which is swiveled on a king-bolt 72 extending downwardly through the body 2. The bolster 70 is equipped at its upper portion with a fifth wheel member 74 rotatably connected to a companion member 75 secured to the underside of the body 2. A brace 76, connected to the body 2 and the bolster 70, coacts with the fifth wheel structure 74—75 in relieving the king-bolt 72 of bending stresses.

Steering means in the form of a pair of connecting rods 78 are pivotally secured at their forward ends to the bolster 70 and at their rear ends to diametrically opposed ears 80 on the collar 64. The connecting rods 78 are bent at their rear portions as shown by Fig. 2, to prevent their contacting with the brackets 30 during the act of steering the vehicle.

The vehicle may be stopped or its speed controlled by suitable brake mechanism consisting in the present instance of a brake wheel 81 fixedly mounted upon the rear axle 8, a brake shoe 84 and a foot piece 86 carrying said brake shoe 84 and extending upwardly through a guide 87 and an opening in the body 2. The foot piece 86 is normally held in raised position by a spring 88 so that the brake shoe 84 will be normally held out of contact with the brake wheel 81.

In practice one child at one of the handle bars 44 may operate the propelling and steering mechanisms, or said mechanisms may be operated by a child at each handle bar, as by referring to Fig. 1 it will be readily seen that when a rocking motion is imparted to the lever 42 in a vertical plane said lever will drive the vehicle through the intermediary of the pitman 32, the crank shaft 26, the sprocket wheel 24, the chain 22, the sprocket wheel 16, the ratchet teeth and pawls 14 and 12, respectively, the disk 10, the rear axle 8 and the conveyer wheel 20 fixed to said rear axle.

When it becomes necessary to steer the vehicle in order to avoid obstructions or turn corners, either end of the lever 42 is moved in a horizontal plane to the right or left, which operation turns the column 50 axially and through the intermediary of the connecting rods 78, turns the bolster 70 upon the king-bolt 72 and thus effects the steering of the front wheels 68. When the lever 42 is swung to the right or left, as stated, the bifurcated member 36 turns axially upon the pitman 32 instead of twisting the latter as would be the case if it were fixed rigidly to said pitman. In order to relieve the bracket 48 and the pivot 46 of undue stresses tending to twist or bend the same when the lever 42 is moved to the right or left to steer the vehicle, I provide the upper portion of the member 50 with a loop 61 through which the lever 42 extends and against which it presses when moved, as stated, there being sufficient play in the pivot 46 to permit the lever to contact either side of said loop 61.

Should it be desirable to reduce the speed of the vehicle or stop the same this may be accomplished by applying the brake shoe 84 to the brake wheel 81 through downward pressure upon the foot piece 86.

When descending grades the vehicle may be permitted to coast by holding the lever 42 stationary as the pawls 12 will slide by the ratchet teeth 14 while the sprocket wheel 16 remains stationary.

From the foregoing description it is apparent that we have provided a vehicle which is safe for children to operate and embodies the advantages above pointed out, and while we have shown and described one form of the invention we reserve all rights to such other forms and modifications thereof as properly fall within the spirit and scope of the invention as claimed.

Having thus described our invention, what we claim and desire to secure by Letters Patent, is:

In a vehicle of the character described, a body having an opening therein, a tubular member mounted in said opening, a hand lever rockably mounted upon said tubular member, a pitman actuated by said hand lever and extending through said tubular member, and mechanism actuated by said pitman for propelling the vehicle.

In testimony whereof we affix our signatures.

ALBERT R. GRIGSBY.
HAROLD BROWN.